UNITED STATES PATENT OFFICE.

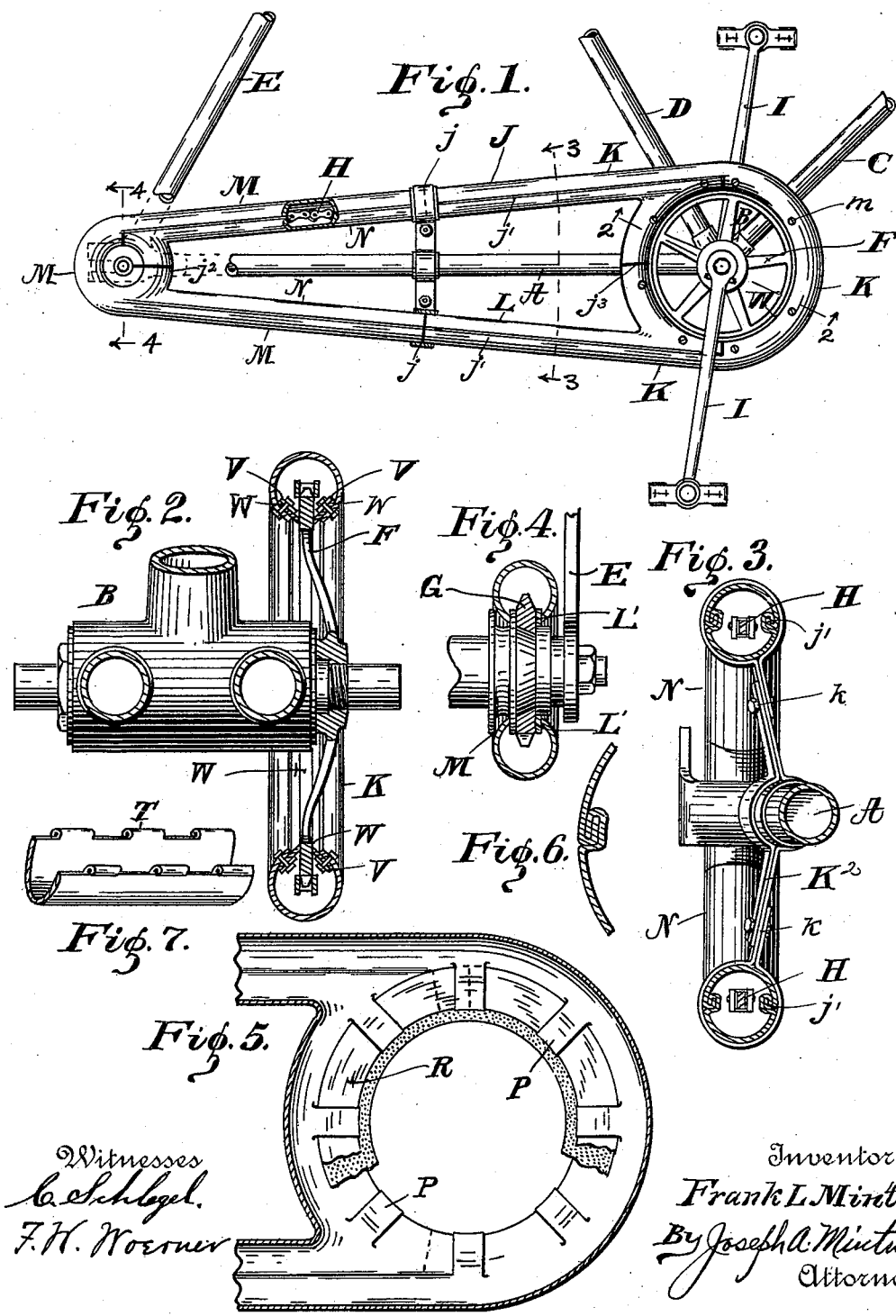

FRANK L. MINTURN, OF NOBLESVILLE, INDIANA.

GEAR-CASE.

SPECIFICATION forming part of Letters Patent No. 599,005, dated February 15, 1898.

Application filed July 3, 1896. Serial No. 597,974. (No model.)

*To all whom it may concern:*

Be it known that I, FRANK L. MINTURN, a citizen of the United States, residing at Noblesville, in the county of Hamilton and State of Indiana, have invented certain new and useful Improvements in Gear-Cases; and I do hereby declare the following to be a full, clear, and exact description of the invention, such as will enable others skilled in the art to which it appertains to make and use the same.

The object of this invention is to provide a case for protecting the chain and gears of bicycles from dust. Much attention in the construction of bicycles has been devoted to protect the axle-bearings and the bearings for the crank-shaft from dust and dirt, but the object of my invention is to protect the chain with its numerous joints and the sprocket-wheels over which the chain continually runs from the dust and dirt to which these parts are more thoroughly exposed than any other of the entire mechanism of a bicycle. The constant grinding soon reduces the size of the sprockets on the wheels and increases the openings in the chain until the parts no longer fit and the chain begins to ride on the sprockets.

The object of this invention is to provide a case in removable parts, so ready access will be afforded to the inside parts.

The object also is to provide means whereby the chain can be kept constantly lubricated.

I accomplish the objects of the invention by the mechanism illustrated in the accompanying drawings, in which—

Figure 1 is a detail in side elevation showing part of the frame of a bicycle with my improved gear-case applied. The rear fork end connection and rear stay and bottom run, where those parts would come in front of and obstruct the rear sprocket, are shown in dotted lines. The top section of the gear-case is broken away to show the chain on the inside. Fig. 2 shows the bottom bracket and the front sprocket-wheel and gear-case in section on the line 2 2 of Fig. 1. Fig. 3 is a section on the line 3 3 of Fig. 1. Fig. 4 is a section on the line 4 4 of Fig. 1. Fig. 5 is a detail in longitudinal section of a gear-case, showing a modified construction for the purpose of holding the packing-ring of flexible material in place without screws or rivets. Fig. 6 is a detail showing the formation of the sliding joint for uniting the sections. Fig. 7 is a detail of one of the longitudinal parts of the case, showing a modification in which the edges instead of being bent so as to form hooked edges are made into a series of hinged projections to be threaded together by passing a wire through the openings in the projections thus provided.

Similar letters of reference indicate like parts throughout the several views of the drawings.

A is the bottom run of a bicycle, B the bottom bracket, C the bottom line-post, D the king or seat post tube, E the rear stay, F the front sprocket-wheel, G the rear sprocket-wheel, H the chain, and I the crank, all of which parts may be and are of any usual construction.

J represents the gear-case, which will preferably be made out of sheet metal, although leather, hard rubber, or other material might be used. The case will be divided up into sections to permit of its application to the parts to be covered and easy removel therefrom without taking any of the mechanism of the bicycle apart, and the manner of dividing the case and of uniting the divided parts so as to make a dust-proof case constitutes important features of my invention. The case consists of two annular portions surrounding the large and small sprocket-wheels and two straight tubular sections connecting the annular parts. These two straight parts are divided transversely approximately midway of their lengths on the line $jj$ and the ends lapped to make a tight joint. The straight tubes are also halved longitudinally on the lines $j'$, so as to produce the front outside section K and inside section L and the rear outside section M and inside section N. The meeting edges of these sections are bent in the manner as shown in cross-section in Fig. 6, whereby a sliding joint is produced. The inside sections L and N may for greater convenience in their application and removal be divided at $j^2$ and $j^3$ into two parts each; but this is not absolutely essential, because the elastic nature of the material will allow the parts to "spring" enough to come together. The parts at $jj$ will be overlapped and will be encircled with a band of felt or other material to prevent abrasion, and these in turn will be encircled with the clamp ends of the supporting-bracket K². The bracket K² is clamped around and to the bottom run A of the bicycle-frame and will have a felt or other soft material interposed between the parts to prevent marring the run A. As shown in Fig. 3, the bracket will preferably consist of one piece bent to form half of the clamp around the run A and having the ends turned in a loop or circle to form the clamp for the gear-case. A second bar forms the remaining half of the clamp around the run A, and all of the parts are brought together by means of two bolts $k$. By this means the gear-case is supported and the ends of the sections of the case are held together. To make a tight joint around the hub of the rear sprocket-wheel, the washers L', of felt or other suitable material, will be used and will be placed between the gear-case and the sprocket-wheel, as clearly shown in Fig. 4.

To insure a dust-proof joint between the gear-case and the front sprocket-wheel, I will provide two annular bands of felt and will place them one on each side of the sprocket-wheel and between said wheel and the circular margin or edge of the gear-case. The felt rings will be applied so the inside edges will contact with the solid rim of the sprocket-wheel immediately inside of the sprockets. These bands of felt are represented at W, and they are held in place by means of the metal rings V, which are placed between the wheel and the band W, and the latter held by screwing or riveting the inside ring V to the outside case. The screws for this purpose are represented by $m$ in Figs. 1 and 2.

Fig. 5 shows a modified construction in which a series of radial slots are made in the outside case and tongues P produced. These tongues are bent in such shape that they will retain the metal ring R and the felt washer without other means of securing them. The ring R is to be of two pieces in this construction. After the four fundamental parts K, L, M, and N of the gear-case are in position the felt washer is put in place, one-half of ring R is slipped in between tongues P and the felt washer and is pressed out under the tongues P as far as possible, then the other half is slipped in on the opposite side, and when both halves are in position the ends of the semicircular rings R will spring into or toward the felt, thereby making some exertion necessary for their removal.

In the modification shown in Fig. 7 instead of a sliding joint the two parts of each tube are provided with hinge-loops T, formed by bending integral tongues of the gear-case material around into shape. The opposite section of the case will have hinge-loops to fit between the ones in its mate, and the two will be joined by passing a wire through the openings in the loops, making it necessary to withdraw the wires to remove the gear-case.

As the lowest part of the gear-case is under the front sprocket and as this part of the gear-case is readily made tight enough to hold an oil lubricant in sufficient quantities to keep the chain and sprocket-wheels thoroughly lubricated, I will fill the case sufficiently full of oil to keep the chain constantly well oiled.

I am aware that gear-cases having an annular portion to surround the periphery of the gear-wheel, the inner edges of which make flexible rubbing contacts with the surface of the wheel, have been made, and I do not claim such construction broadly; but What I do claim, and wish to secure by Letters Patent of the United States, is—

1. A tubular gear-case for vehicles having an annular portion to inclose the periphery of the front sprocket-wheel but not covering the spokes, the edges of which touch the rim to form a dust-proof joint with said wheel and having the rear and front sprocket-cases connected by tubular sections separate from each other but united as one piece with the end or spocket-wheel sections, the said case being in a plurality of parts removably united by dust-proof joints.

2. In a tubular gear-case for protecting the chain and sprocket-wheels of a bicycle from dust, &c., an annular portion to surround the rim of the front sprocket-wheel but not covering the spokes of said wheel and having felt rings or washers W, on both sides of the periphery of the sprocket-wheel just under the sprockets to exclude the dust and so placed that the washer will have an unbroken surface of the sprocket-wheel to bear against.

3. In a gear-case for vehicles, the two-part outer sections K and M and the two-part inner sections L and N, said inner parts being united to the outer parts by sliding lock-joints in the manner substantially as described and for the purposes specified.

4. In a dust-proof gear-case for vehicles, the combination with the two annular sections forming the case for the front sprocket-wheel, of the tongue P, the semicircular rings R and the felt washers all combined substantially as described to form a dust and oil proof joint about a revolving body.

In testimony whereof I affix my signature in presence of two witnesses.

FRANK L. MINTURN.

Witnesses:
GEO. SHIRTS,
WILL H. LEBO.